R. V. WALLACE.
DIFFERENTIAL GEARING.
APPLICATION FILED JAN. 20, 1916.

1,203,085.

Patented Oct. 31, 1916.
2 SHEETS—SHEET 1.

Witnesses

R. V. Wallace  Inventor
by  Attorneys

R. V. WALLACE.
DIFFERENTIAL GEARING.
APPLICATION FILED JAN. 20, 1916.
1,203,085.
Patented Oct. 31, 1916.
2 SHEETS—SHEET 2.
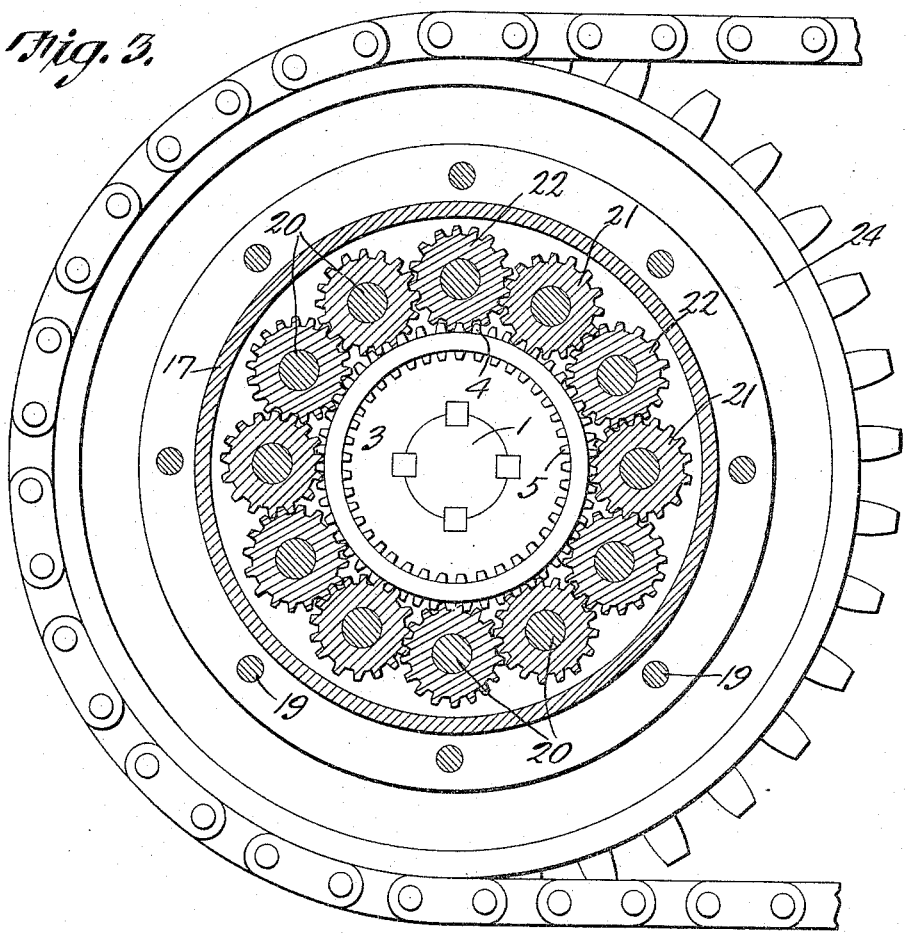
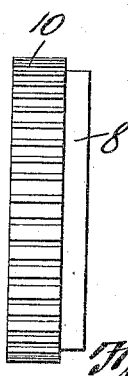
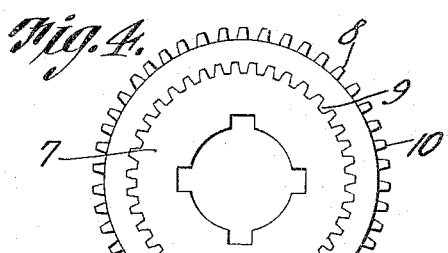
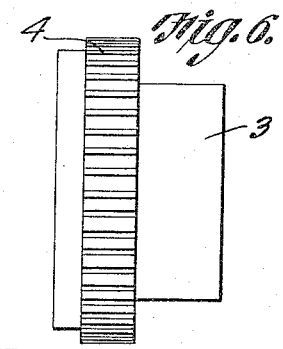
Witnesses
R. V. Wallace, Inventor
by Attorneys

UNITED STATES PATENT OFFICE.

ROBERT V. WALLACE, OF CHENEY, WASHINGTON.

DIFFERENTIAL GEARING.

1,203,085.  Specification of Letters Patent.  Patented Oct. 31, 1916.

Application filed January 20, 1916. Serial No. 73,208.

*To all whom it may concern:*

Be it known that I, ROBERT V. WALLACE, a citizen of the United States, residing at Cheney, in the county of Spokane and State of Washington, have invented a new and useful Differential Gearing, of which the following is a specification.

This invention relates to differential gearing especially designed for use in connection with tractors, one of the objects of the invention being to provide differential gearing having means whereby the same can be locked so as to be rendered inactive as a differential.

A further object is to provide differential gearing including a novel arrangement of gears whereby the usual functions of a differential are obtained, a simple and efficient means being provided for quickly locking or unlocking the differential when a straight drive is desired.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
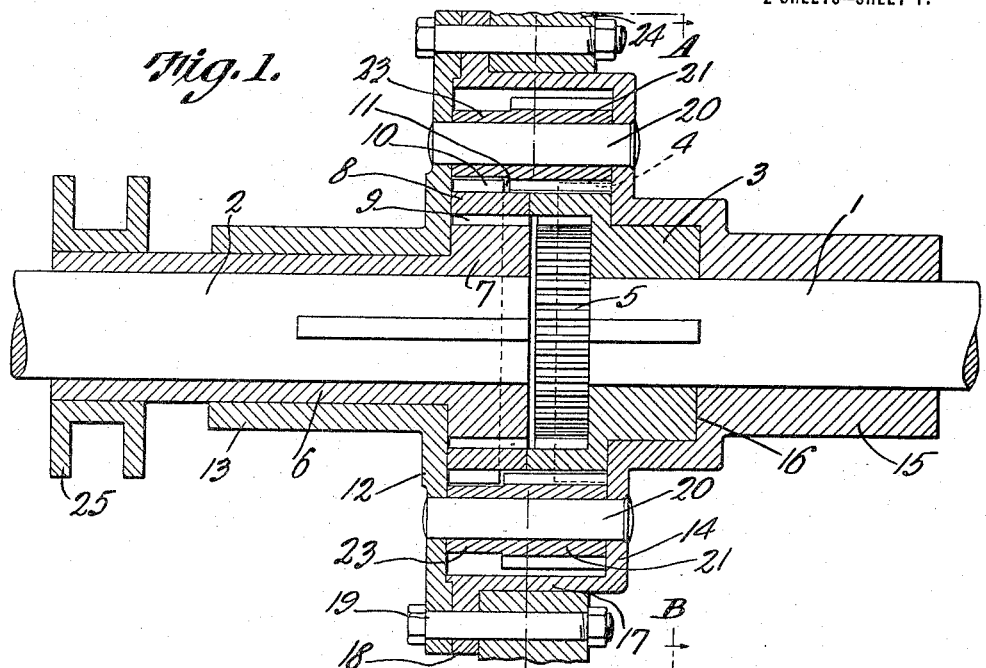
Figure 2:
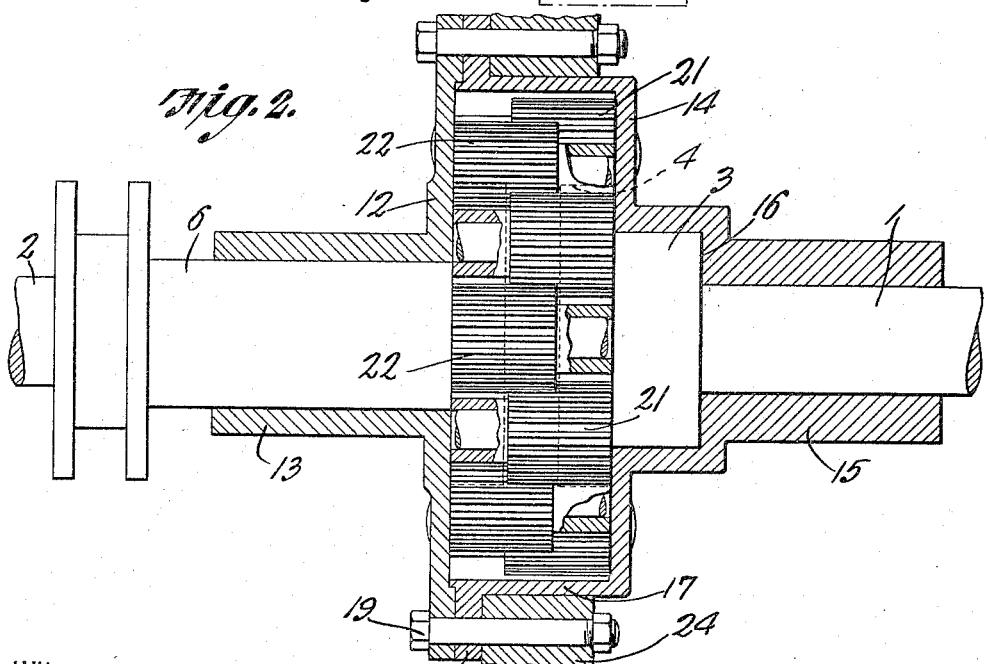

In said drawings:—Figure 1 is a central vertical section through the differential taken transversely thereof. Fig. 2 is a section through the casing of the differential but showing the gears therein in elevation, portions of the gears being broken away. Fig. 3 is a section on line A—B Fig. 1. Fig. 4 is a face view of the lock and ring gears. Fig. 5 is a side view of the ring gear. Fig. 6 is a side view of the master gear.

Referring to the figures by characters of reference 1 and 2 designate the alining shafts adapted to be driven by the differential. Keyed on the shaft 1 is the hub 3 of the master gear which, as shown particularly in Fig. 4, has external teeth 4 and internal teeth 5, the external teeth 4 being extended only partly across the outer face of the gear.

Feathered on shaft 2 is a sleeve 6 provided at one end with a locking gear 7 normally removed from the master gear but being shiftable into and out of engagement with the internal teeth 5 of said master gear. A ring gear 8 is extended around the locking gear 7 and has internal teeth 9 constantly in mesh with the teeth of gear 7. This ring gear is also provided with external teeth 10 which, however, do not extend throughout the width of the ring. The ring gear 8 and the master gear have their ends in loose engagement with each other but as the external teeth upon the master gear and upon the ring gear do not extend entirely across said gears, it will be apparent that an annular clearance is thus formed between the two series of external teeth, as shown at 11.

The master gear, ring gear and locking gear are arranged within a housing made up of opposed members detachably connected. One of these members includes a disk 12 having a tubular extension 13 in which the sleeve 6 is mounted for rotation. The other member includes a disk 14 having a tubular extension 15 at the center thereof in which the shaft 1 is journaled, there being a recess 16 in one end portion of this extension for the reception of the hub 3 of the master gear. An annular spacing flange 17 is formed on the disk 14 and is provided, along its free edge, with an attaching flange 18 adapted to be secured to the disk 12 by transverse bolts 19 or in any other suitable manner. The two disks 12 and 14 are likewise connected by regularly spaced bearing pins 20 on which are arranged two series of pinions 21 and 22, each pinion having a reduced extension or sleeve 23 at one end. The pinions of the two series are alternately arranged and all of the pinions of one series are disposed oppositely to the pinions of the other series, it being understood that the pinions of both series are of the same size and proportions. When the pinions are positioned within the housing the pinions of one series will mesh with the external teeth 4 of the master gear while the pinions of the other series will mesh with the external teeth 10 of the ring gear, the pinions of the two series meshing with each other as shown particularly in Fig. 3. A sprocket 24 or any other suitable form of power transmitting device may be extended around the spacing flange 17 and secured to the housing, if desired, by means of the bolts 19. The locking gear 7 can be shifted longitudinally of the shaft 2 by any suitable means provided for that purpose. For example, a shipper collar 25 may be secured to the exposed end of the sleeve 6 and a lever or the like employed for pressing against said collar to slide the sleeve 6 in either direction.

It will be obvious that by providing the arrangement of gears illustrated, when the housing 14 is rotated by a drive chain or the like, the bearing pins 20 will all move therewith. As the pinions 21 and 22 are in mesh with each other and with the external teeth on the master gear and the ring gear, it will be obvious that they will be locked under ordinary conditions so that they will travel in a circle with the pins 20 and without rotating independently of each other, thus causing power to be transmitted from the master gear to the shaft 1 and from the ring gear 8 to the locking gear 7 and thence to shaft 2. Consequently both shafts will be rotated in the same direction and at the same speed. However, should, for example, the shaft 2 be retarded in its rotation, as while the vehicle is traveling along a curved path, the external teeth of the ring gear 8 will hold back upon the pinions 22 in mesh therewith and the pinions 21 will thus be shifted relative to the pinions 22 so as to rotate the master gear with the result that a relative movement of the two shafts 1 and 2 will be set up. In other words, the action will be the same as that of the ordinary differential.

Should it be desired to couple the two shafts 1 and 2 together so that they will rotate as one shaft and not be capable of independent rotation, the sleeve 6 would be shifted longitudinally to move the locking gear 7 partly out of engagement with the internal teeth of the ring gear 8 and into engagement with the internal teeth 5 of the master gear. Thus this locking gear will act as a means for locking the master gear to the shaft 2 with the result that both of the shafts 1 and 2 will rotate as one shaft.

What is claimed is:—

1. A differential including shafts, a revoluble drive housing, a master gear secured on one shaft and having internal and external teeth, a locking gear feathered on the other shaft and having external teeth, a ring gear extending around said locking gear and having internal and external teeth, the internal teeth being constantly in mesh with the teeth of the locking gear, means for shifting the locking gear into mesh with the internal teeth of the master gear to lock the master gear to the ring gear, series of pinions extending around the master and ring gears and carried by the housing, the pinions of one series meshing with the external teeth of the master gear and the pinions of the other series meshing with the external teeth of the ring gear, the pinions of said series being alternately arranged and constantly in mesh with each other.

2. A differential including shafts, a revoluble drive housing, a master gear secured to one shaft and having internal and external teeth, a locking gear feathered on the other shaft and having external teeth, a ring gear extending around said locking gear and having internal and external teeth, the internal teeth being constantly in mesh with the teeth of the locking gear, means for shifting the locking gear into mesh with the internal teeth of the master gear to lock the master gear to the ring gear, series of pinions extending around the master and ring gears and carried by the housing, the pinions of one series meshing with the external teeth of the master gear and the pinions of the other series meshing with the external teeth of the ring gear, there being an annular clearance between the external teeth on the master gear and ring gear, the pinions of said series being alternately arranged and those portions of the pinions extending into the clearance being constantly in mesh with each other.

3. A differential including shafts, a revoluble drive housing, a master gear secured on one shaft, a ring gear concentric with the other shaft, slidable means within the ring gear for holding said gear constantly coupled to its shaft and for coupling the master gear to and uncoupling it from the ring gear, there being an annular clearance between the teeth on the master and ring gears, series of pinions extending around the gears and carried by the housing, the pinions of one series meshing with the master gear and the pinions of the other series meshing with the ring gear, those portions of the pinions extending into the clearance being constantly in mesh with each other, the pinions of said series being alternately arranged.

In testimony that I claim the foregoing as my own, I have hereto affixed my signature in the presence of two witnesses.

ROBERT V. WALLACE.

Witnesses:
 OSCAR E. LAWTON,
 J. E. WHALEN.

Copies of this patent may be obtained for five cents each, by addressing the "Commissioner of Patents, Washington, D. C."